March 4, 1958 G. W. SCHUETZ 2,825,459
SEPARATORY APPARATUS
Filed Dec. 9, 1954 3 Sheets-Sheet 1
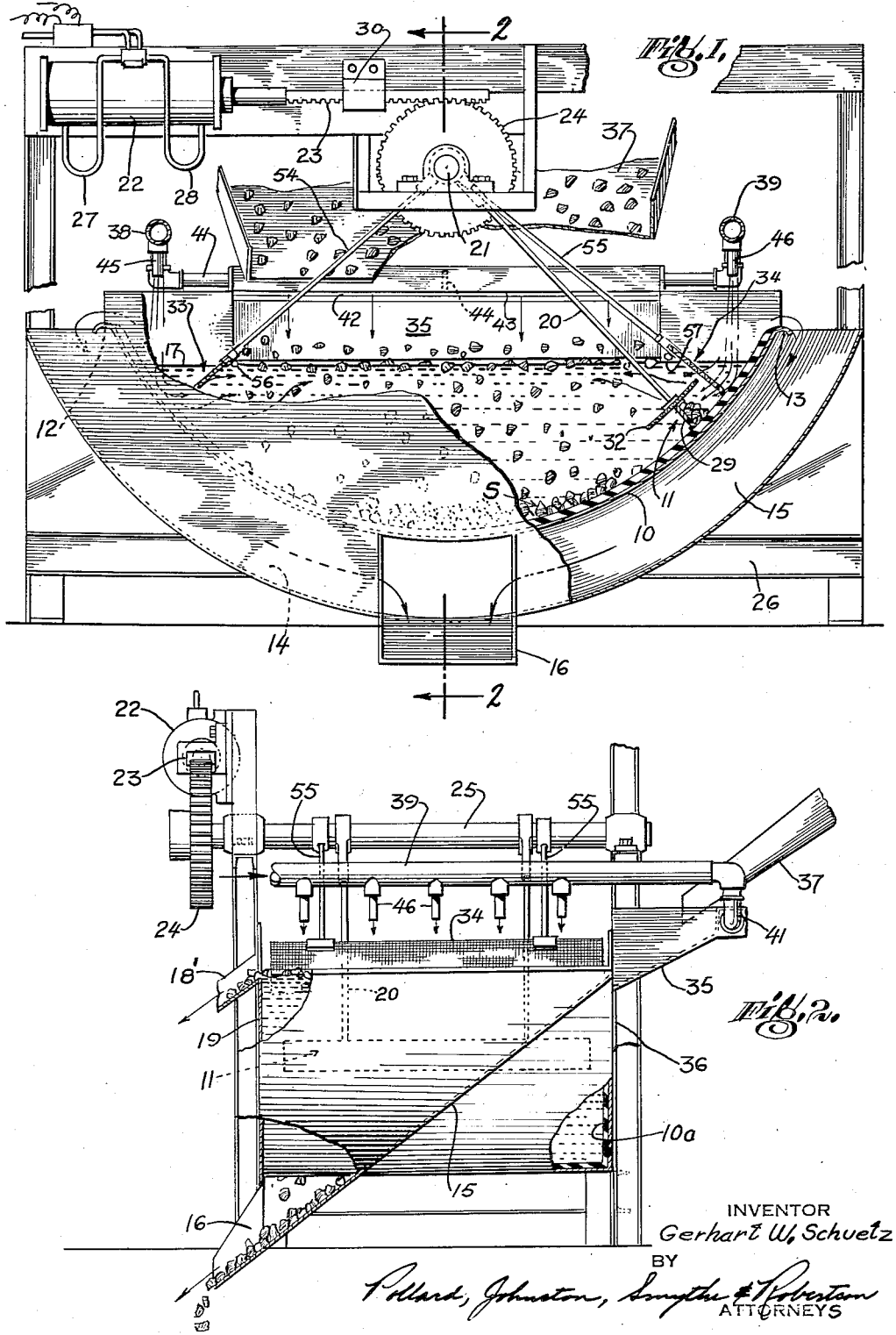
INVENTOR
Gerhart W. Schuetz
BY
Pollard, Johnston, Smythe & Robertson
ATTORNEYS March 4, 1958 — G. W. SCHUETZ — 2,825,459
SEPARATORY APPARATUS
Filed Dec. 9, 1954 — 3 Sheets-Sheet 2
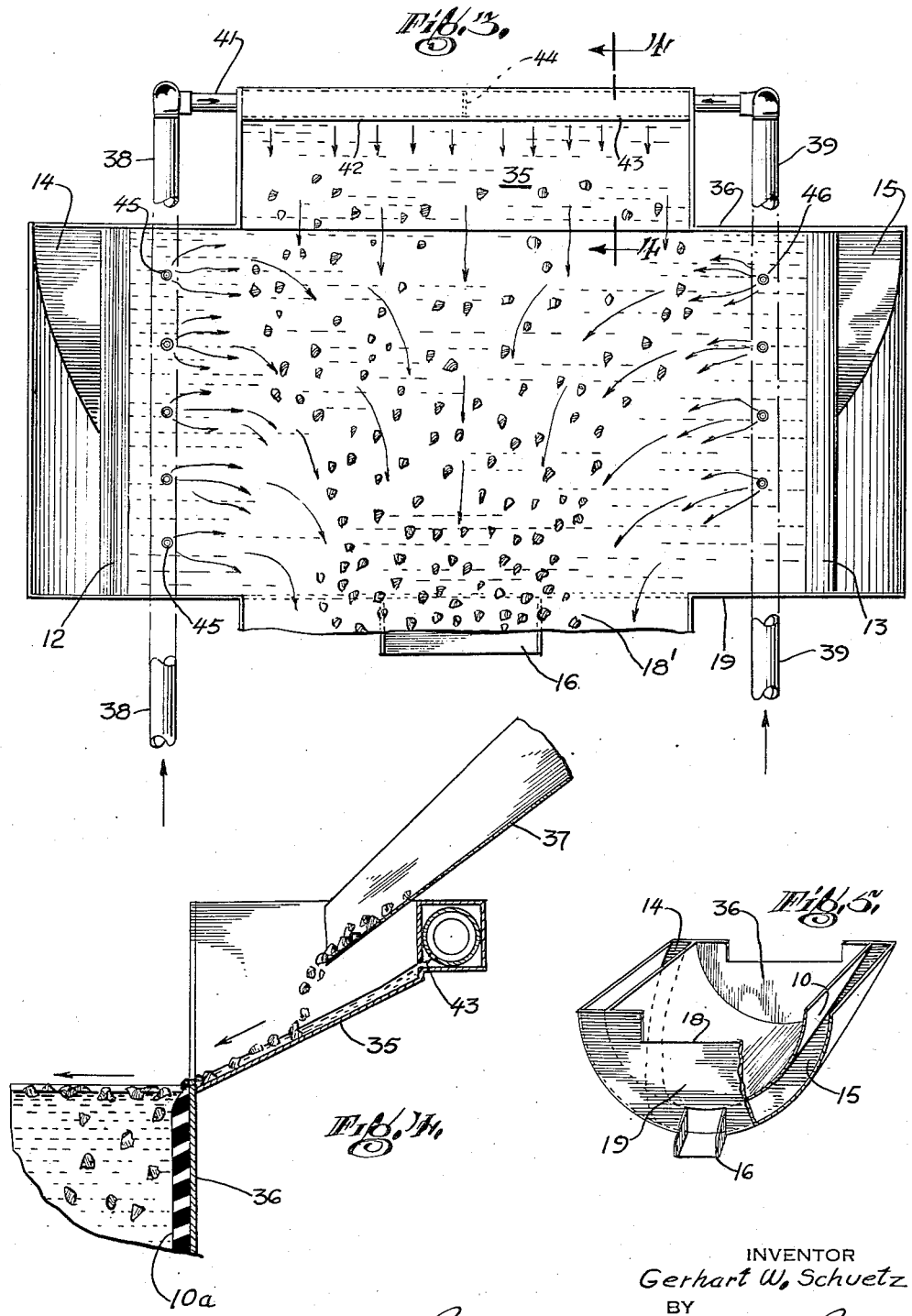
INVENTOR
Gerhart W. Schuetz
BY
Pollard, Johnston, Smythe & Robertson
ATTORNEYS March 4, 1958 — G. W. SCHUETZ — 2,825,459
SEPARATORY APPARATUS
Filed Dec. 9, 1954 — 3 Sheets-Sheet 3

INVENTOR
Gerhart W. Schuetz
BY
Pollard, Johnston, Smythe & Robertson
ATTORNEYS

Patented Mar. 4, 1958

2,825,459
SEPARATORY APPARATUS

Gerhart W. Schuetz, New York, N. Y., assignor to The Ore & Chemical Corporation, New York, N. Y., a corporation of New York Application December 9, 1954, Serial No. 474,156

4 Claims. (Cl. 209—172.5)

This invention relates to an improved apparatus for the gravity separation of materials, as in coal cleaning, ore beneficiation, classification of solids, and for other uses, and more particularly to improvements in the type of separatory vessel described in the patent granted to Rudolf Schreiber and Gerhart W. Schuetz for "Sink-Float Separatory Apparatus," dated June 26, 1956, No. 2,752,040.

An object of my invention is to provide apparatus for gravity separation of materials in liquid media in which material suspended in the medium, or floating at the surface of the medium—i. e. material suspended at or near the surface—will be kept away from the points of discharge of sunken material without the use of fixed baffles or the like, or, where baffles may be desired, such suspended material will be kept from moving past the baffles.

Such apparatus may take the form of a separator in which a vessel containing heavy liquid medium is employed. The medium may consist of water and finely ground materials, such as for example, finely ground magnetite, ferrosilicon or galena mixed to a specific gravity which floats one component of the material to be separated, and permits another component to sink. The process performed with the use of heavy media apparatus is generally referred to as dense media or heavy media separation.

Alternatively the apparatus may take the form of a classifier in which coarse particles are separated from fine in a water suspension through the difference in settling rate of different size particles in suspension.

In accordance with my invention, there is provided a separatory vessel to contain a pool of liquid medium, an outlet for floating material and a rake movable along the bottom of the vessel to move sunken material to an outlet, from which it can be discharged. Means are provided to introduce liquid medium into the vessel so as to produce currents at or near the surface of the pool which will flow generally in a direction away from the discharge outlet for the sunken material. Because of the presence of such currents, the material suspended at or near the surface of the pool is kept away from the path of the rake, the result being that an intermixture of the components of the material separated by the apparatus is prevented.

The means for supplying liquid medium to the vessel are arranged to introduce the medium either from above or below the surface of the pool of medium in the vessel. The medium enters the pool adjacent the discharge outlet for the sunken material so as to create currents to keep the suspended material from flowing out along with the sunken material removed by the rake. This liquid supply means preferably comprises a series of orifices arranged in a line adjacent the discharge outlet.

The means to introduce liquid medium can be employed in conjunction with a movable barrier screen operating adjacent the end of the path of the rake, such as disclosed herein and disclosed and claimed in a copending application of Gerhart W. Schuetz and James L. Kearns, Serial No. 474,157, filed December 9, 1954.

Other objects, features and advantages will be apparent from the following detailed description and the accompanying drawings in which I have set forth the best mode contemplated by me of carrying out my invention.

In the drawings:

Fig. 1 is a front elevational view of a preferred embodiment illustrated partly in section so as to reveal some of the details of construction and operation;

Fig. 2 is a side elevational view of the apparatus shown in Fig. 1, partly in section along line 2—2 of Fig. 1;

Fig. 3 is a top plan view of the vessel of Fig. 1, the upper portions of the apparatus being removed;

Fig. 4 is an enlarged fragmentary vertical sectional view taken along line 4—4 of Fig. 3;

Fig. 5 is a perspective view of the separatory vessel per se, the piping and machinery being removed for clarity;

Figure 6:
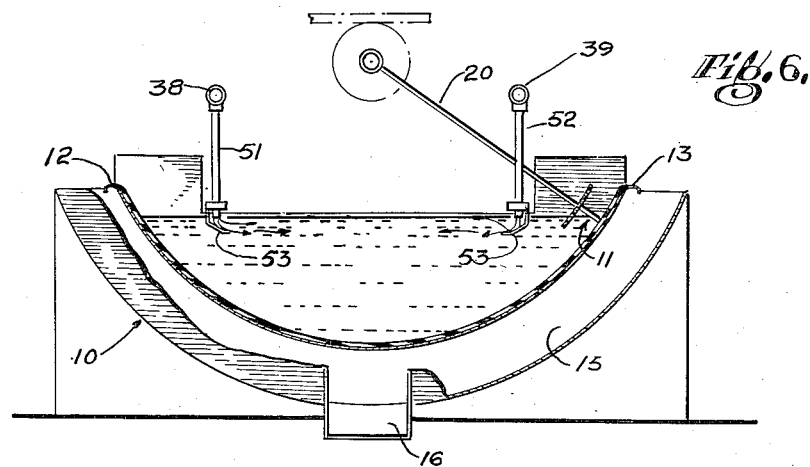
Fig. 6 is a cross-sectional view of a first modification of the apparatus, in which spray plates are employed upon the medium introducing means.
Figure 7:
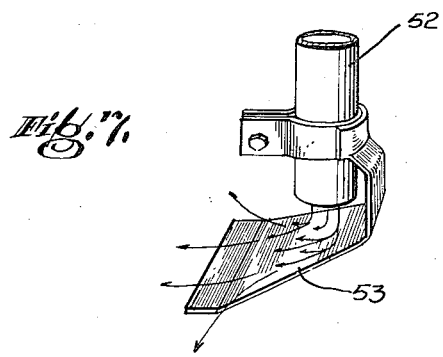
Fig. 7 is a perspective view of a spray plate such as is used in the first modification.

Referring first to Fig. 1 of the drawings, a preferred embodiment of the improved separatory apparatus is there shown, which comprises a separatory vessel 10 of generally arcuate form in vertical section, and a rake 11 movable back and forth in a generally arcuate path along the inner surface of the vessel. The inner surface of the vessel may be lined with rubber or the like, as shown at 10a, but the lining may be omitted if desired. Discharge outlets 12 and 13 are located on the ends of the vessel, and the rake 11 serves the purpose of moving sunken material S (commonly referred to as the "sink") from the bottom of the vessel to the discharge outlets at the respective ends of the path of the rake. The sunken material that has been moved by the rake to the outlets falls down along the sink or refuse launders 14 and 15, and emerges from the sink discharge chute 16 at the front of the vessel.

Inside the vessel 10 is a pool 17 of liquid medium to be used for the separation of material. It can be a comparatively dense or heavy medium in the event that the apparatus is to be used for heavy media separation, or it can be water in the event that the apparatus is to be used as a classifier. The liquid medium is maintained at a level near or slightly below the level of the sink discharge lips of outlets 12 and 13. As shown in Figs. 2 and 5, a float outlet, or weir, 18 is located in the front wall 19 approximately centrally of the vessel, the overflow edge of this weir being slightly below the level of the medium in the vessel so that a continuous flow will take place through this weir. Such an arrangement is provided in order to carry off material suspended at or near the surface of the liquid medium. In this manner, the material supplied to the vessel is separated or classified, for as previously described, the material that sinks to the bottom of the vessel is carried by the rake to one or the other of the sink discharge outlets, and thence to the launders 14 and 15, and chute 16.

So that the suspended material flowing from weir 18 will not fall into the sunken material that leaves the vessel from discharge chute 16, an outlet trough 18' is employed. This trough preferably is placed in the manner shown in Figs. 2 and 3 whereby the floating material moves in a straight path from the feed box 35 across the surface of the medium and through the outlet trough to the delivery point.

The rake is mounted on arms 20 which extend radially with respect to the path of the rake to a pivotal mounting 21 above the vessel. The blade 29 of the rake is preferably rigidly mounted with respect to the arms 20, although if desired it could be pivotally connected in accordance with the aforesaid application Serial No. 374,686, now Pat. No. 2,752,040, so that the rake blade will always have a favorable angle of inclination for discharge of the sink. According to the arrangement, the rake may be brought slightly above the discharge lips of the sink outlets during each upward movement in order to completely discharge the material into the sink launders.

The rake is actuated by a double-acting air or hydraulic cylinder 22. Extending from the cylinder is a continuation of the piston rod in the form of a rack 23 arranged to mesh with gear 24 affixed to a rockable shaft 25. The rake arms 20 are rigidly connected to the shaft so that as the gear and shaft oscillate, the rake will be moved back and forth across the bottom of the vessel. A bearing block 30 secured to frame 26 keeps the rack 23 in mesh with gear 24 and prevents lateral displacement of the rack. As may be noted from Fig. 1, the cylinder 22 is horizontally disposed, thereby enabling this apparatus to be utilized in a location in which head-room is restricted.

The cylinder may be supported directly by base frame 26 that supports the vessel 10, or alternatively it may be supported by an independent structure in order that the cylinder, the gear and the rake may be lifted as a unit vertically away from the vessel to facilitate cleaning and repairs of the apparatus. The cylinder is equipped with connections 27 and 28 at its ends in order to alternately admit high pressure fluid to one end of the cylinder and to allow low pressure fluid to flow away from the other end of the cylinder. The flow of fluid to and from the cylinder preferably is regulated by an automatic control mechanism in order that the operation of the rake will be automatic. Structure for supporting the cylinder and mechanism for controlling its operation are incorporated in the above-mentioned application, Serial No. 374,686, now Pat. No. 2,752,040, and form no part of the present invention.

The rake blade 29 is comparatively rigid so that it will not bend in its longitudinal dimension to any great extent while moving sunken material to the outlets. The blade is preferably constructed of a heavy screen or mesh supported in a metal frame, and inasmuch as it is desirable that the rake be able to move even small particles of sink, the mesh has comparatively small apertures. The edge of the blade contacting the inner surface of tank 10 is preferably made of rubber so as to be flexible enough to have a "wiping" action along the inner surface of the tank. The motion of the rake across the inner surface of the vessel is comparatively slow and as a result, there is little vibration, and the power requirements are small. Because of the reciprocatory motion of the rake, the pool of medium is maintained relatively quiet during the operation of the apparatus.

Mounted above the rake blade 29 is a screen 32 that is preferably rigidly mounted with respect to the arms 20. This screen 32 serves the function of lifting the pivotally mounted barrier screens 33 and 34 so as to allow the sunken material to be carried into the sink outlets 12 and 13 by the action of the rake 11.

As best seen in Fig. 4, the material to be separated is fed into the vessel from the downwardly sloping feed box 35, this member being located at the back of the vessel and above the surface of the pool. A trough 37 is located above the feed box, from which the material to be separated is dropped into the feed box at the desired rate or times.

If desired, the piping system for supplying liquid medium to the vessel to replace that which flows out through float weir 18 can be provided in such a manner as to facilitate the introduction of material from the feed box into the vessel. This piping system principally consists of manifolds 38 and 39 which are located above the opposite ends of the vessel, the manifolds being extended along the back of the vessel to form a common rear manifold 41. The rear manifold may be partially enclosed in a box-like structure at the upper end of the feed box in the manner shown in Fig. 4. Slots 42 and 43 are provided along a lower portion of the rear manifold in order that replacement medium can flow from the rear manifold along the feed box 35 in the general manner shown in this figure. An obstruction 44 is provided at approximately the mid-point of the rear manifold so that the medium flowing from the slots 42 and 43 could be independently controlled if desired.

It has been found that under some conditions of operation, material suspended at or near the surface of the pool tends to float toward the outlets 12 and 13 where it could be carried along with the sunken material S into the sink launders 14 and 15.

According to my invention, provision is made to maintain the suspended material at substantially the mid-portion of the vessel so that such material will be carried through the float weir 18 rather than into the sink outlets 12 and 13. To bring about such an effect, orifices are arranged adjacent the ends of the vessel in such a manner that the replacement medium will produce currents at or near the surface of the pool, flowing toward the center of the vessel. Such an arrangement not only serves the purpose of maintaining the suspended material away from the path of the rake, but it also can contribute most of the replacement medium that is being supplied in order to maintain the desired depth of medium in the vessel. As an example, approximately 20% of the replacement medium can be supplied through the slots of rear manifold 41, the remaining 80% of the replacement medium being supplied equally through orifices located in the manifolds 38 and 39.

According to a preferred embodiment of my invention, a series of nipples or short pipes 45 and 46 are spaced along the bottom of manifolds 38 and 39, through which replacement medium is supplied to the vessel. The nipples are located over the end portions of the vessel, as best seen in Figs. 1 and 3 of the drawing. Because this arrangement produces currents flowing away from the ends and toward the center of the vessel, the material suspended in the liquid medium is carried toward the float weir 18 in the front of the vessel. In this manner, the surface of the pool of medium adjacent the ends of the vessel is kept free of suspended material, thereby enabling the rake 11 to carry sunken material into the sink outlets without the suspended material and the sunken material being intermixed.

When barrier screens 33 and 34 are employed, the flow of medium from the nipples can be arranged to pass through such screens in the manner shown in Fig. 1 so as to cleanse the screens and prevent the accumulation of debris thereon.

Turning now to Fig. 6 of the drawing, a first modification of my invention is shown. A series of straight pipes 51 and 52 are provided extending downwardly from the manifolds, the lowermost end of each pipe having a deflector or spray plate 53. These spray plates are so shaped that the liquid medium flowing from the pipes 51 and 52 is directed so as to produce currents at or near the surface of the pool, flowing toward the center of the vessel. Thus the suspended material is kept away from the sink discharge outlets and carried toward the outlet 18 in the same general manner as in the apparatus shown in Figs. 1 and 2. The pipes 51 and 52 are located so as not to interfere with rake arms 20.

Figure 8:
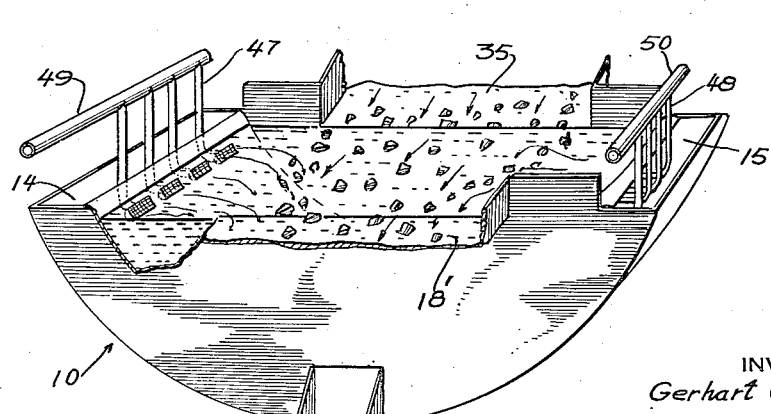
Fig. 8 is a perspective view of a second modification of the apparatus, in which the liquid medium is introduced through the wall of the vessel.

According to a second modification of this invention, which is illustrated in Fig. 8, a series of pipes 47 and 48 lead downwardly from the manifolds 49 and 50 and then turn inwardly to the wall of the vessel at points just below the sink discharge outlets. The outlets of these pipes are preferably evenly spaced along the inside surface of the vessel, and contain a plurality of discharge orifices in order that the replacement medium can be supplied evenly across the surface of each end of the pool so as to keep floating material out of the path of the rake. It should be noted that in this modification, if it is desired to use barrier screens, it is necessary that the manifolds 49 and 50 to be located farther apart than manifolds 38 and 39 of the preferred embodiment in order that the pipes 47 and 48 do not interfere with the operation of such screens.

It is therefore seen that the barrier screens 33 and 34 may be used in conjunction with the means for introducing additional medium along the surface of the vessel in order to prevent the suspended material from floating into the sink discharge outlets and intermixing with the sunken material removed by the rake. As previously mentioned, the barrier screens are lifted at the approach of the rake by the screen 32, to allow the sunken material to be carried into the sink launders. The two barrier screens can be rotatably mounted upon the shaft 25 by means of arms 54 and 55. The arms 54 and 55 are freely mounted on the shaft so that movement of the barrier screens will be independent of the oscillations of the shaft. Screen return stops 56 and 57 are provided in order that the screens will rest adjacent the outlets 12 and 13 in a position to prevent material suspended at or near the surface from approaching too close to the sink launders.

A typical example of the operation of the three described embodiments for the gravity separation of materials is as follows:

The vessel 10 is filled to the proper level with the desired medium, at which level there will be an overflow from the float weir 18. The control mechanism for the cylinder 22 is then placed into operation so that the rake 11 will be caused to move slowly back and forth along the inner surface of the vessel 10. The material to be separated, such as ore, minerals, coal, etc., is fed into the vessel from the trough 37 via the feed box 35. The lighter components of the material float at or near the surface of the medium, and are removed through the float weir 18.

By the action of the rake, the sunken material is moved to one or the other of outlets 12 or 13, where it falls down the sink launders 14 or 15 and out through the sink discharge chute 16.

The material suspended at or near the surface of the medium is prevented from approaching the outlets 12 and 13 by virtue of the manner of introduction into the vessel of the medium used to replace that which flows through the weir 18. Also, the suspended material is kept out of the path of the rake, and thus prevented from intermixing with the "sink."

The speed of operation of the rake 11 may be varied in accordance with the type of material being processed, i. e. in relation to the time required for separation, the rate of feed, etc. For example, a speed of eight discharges per minute or four discharges to each side per minute may be considered satisfactory for most purposes.

I have found it practicable to design apparatus in accordance with this invention, in its application to heavy media separation, which is capable of handling up to 400 tons of minerals or coal per hour. This is merely exemplary, however, and vessels may be designed for greater capacities as desired.

Subject matter disclosed but not claimed herein is claimed in the aforementioned copending application of Gerhart W. Schuetz and James L. Kearns, Serial No. 474,157, filed December 9, 1954.

The terms and expressions which I have employed are used in a descriptive and not a limiting sense, and I have no intention of excluding such equivalents of the invention described, or of portions thereof, as fall within the purview of the claims.

I claim:

1. Apparatus for gravity separation of materials in liquid media, comprising a vessel to contain a pool of liquid medium, said vessel being of generally arcuate form in vertical section, a rake pivotally mounted for oscillatory movement in a generally arcuate path within the vessel to move sunken material from the bottom of the vessel to discharge outlets at the respective ends of said arcuate path, the movement of the rake in one direction counteracting the directional effect of eddy currents produced upon each preceding movement of the rake in the opposite direction, means to introduce liquid medium into the vessel adjacent the respective ends of said arcuate path of the rake to produce directional currents from both ends of the vessel toward the center, and a discharge weir for material suspended at or near the surface of the pool, said discharge weir being located in a side of the vessel, and the directional currents from the ends of the vessel having confluence centrally of the vessel to turn laterally and carry said suspended material over said weir.

2. Apparatus for gravity separation of materials in liquid media, comprising a vessel to contain a pool of liquid medium, said vessel being of generally arcuate form in vertical section, a rake pivotally mounted for oscillatory movement in a generally arcuate path within the vessel to move sunken material from the bottom of the vessel to discharge outlets at the respective ends of said arcuate path, the movement of the rake in one direction counteracting the directional effect of eddy currents produced upon each preceding movement of the rake in the opposite direction, means to introduce liquid medium into the vessel adjacent the respective ends of said arcuate path of the rake to produce directional currents from both ends of the vessel toward the center, a discharge weir for material suspended at or near the surface of the pool, said discharge weir being located in a side of the vessel, and the directional currents from the ends of the vessel having confluence centrally of the vessel to turn laterally and carry said suspended material over said weir, and means to feed the material to be separated into the pool from the side of the vessel opposite the weir.

3. Apparatus for gravity separation of materials in liquid media, comprising a vessel to contain a pool of liquid medium, said vessel being of generally arcuate form in vertical section, a rake pivotally mounted for oscillatory movement in a generally arcuate path within the vessel to move sunken material from the bottom of the vessel to discharge outlets at the respective ends of said arcuate path, the movement of the rake in one direction counteracting the directional effect of eddy currents produced upon each preceding movement of the rake in the opposite direction, means to introduce liquid medium into the vessel adjacent the respective ends of said arcuate path of the rake to produce directional currents from both ends of the vessel toward the center, a discharge weir for material suspended at or near the surface of the pool, said discharge weir being located in a side of the vessel, and the directional currents from the ends of the vessel having confluence centrally of the vessel to turn laterally and carry said suspended material over said weir, and means to introduce additional liquid medium into the vessel from the side of the vessel opposite the weir.

4. Apparatus for gravity separation of materials in liquid media, comprising a vessel to contain a pool of liquid medium, said vessel being of generally arcuate form in vertical section, a rake pivotally mounted for oscillatory movement in a generally arcuate path within the vessel to move sunken material from the bottom of the vessel to discharge outlets at the respective ends of said arcuate path, means to introduce liquid medium into the vessel adjacent the respective ends of said arcuate path and from one side of the vessel, and a discharge weir for material suspended at or near the surface of the pool, said discharge weir being located in the opposite side of the vessel, and the liquid medium introduced as stated producing three directional currents flowing from the ends and side of the vessel with a confluence of such currents centrally of the vessel turning laterally to carry said suspended material over said weir at a point above the arcuate path of the rake.

References Cited in the file of this patent

UNITED STATES PATENTS

| | | |
|---|---|---|
| 2,608,716 | Harris | Sept. 2, 1952 |
| 2,713,945 | Fontein | July 26, 1955 |
| 2,752,040 | Schreiber | June 26, 1956 |

FOREIGN PATENTS

| | | |
|---|---|---|
| 14,928 | Great Britain | June 28, 1913 |